(12) United States Patent
Jin et al.

(10) Patent No.: US 12,411,788 B2
(45) Date of Patent: Sep. 9, 2025

(54) CHIPLET SYSTEM AND METHOD FOR COMMUNICATING BETWEEN CHIPLETS IN CHIPLET SYSTEM

(71) Applicant: REBELLIONS INC., Seongnam-si (KR)

(72) Inventors: Young-Jae Jin, Seongnam-si (KR); Chang-Hyo Yu, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/807,849

(22) Filed: Aug. 16, 2024

(65) Prior Publication Data
US 2025/0077457 A1   Mar. 6, 2025

(30) Foreign Application Priority Data

Aug. 30, 2023   (KR) .................. 10-2023-0114968
Dec. 13, 2023   (KR) .................. 10-2023-0181259

(51) Int. Cl.
| | |
|---|---|
| *G06F 13/40* | (2006.01) |
| *G06F 13/42* | (2006.01) |
| *G06F 15/78* | (2006.01) |

(52) U.S. Cl.
CPC ...... *G06F 13/4004* (2013.01); *G06F 13/4282* (2013.01); *G06F 15/7807* (2013.01); *G06F 2213/40* (2013.01)

(58) Field of Classification Search
CPC .................................. G06F 13/4004
USPC ....................................... 710/305
See application file for complete search history.

(56) References Cited

U.S. PATENT DOCUMENTS

| 6,678,535 | B1 * | 1/2004 | Narayanaswami | ..... H04L 69/08 370/466 |
|---|---|---|---|---|
| 6,898,766 | B2 * | 5/2005 | Mowery | ............. G06F 13/4045 710/114 |
| 2002/0136224 | A1 * | 9/2002 | Motley | ............... H04L 12/4604 370/477 |
| 2005/0021874 | A1 * | 1/2005 | Georgiou | .............. G06F 15/167 709/250 |
| 2008/0086588 | A1 * | 4/2008 | Danilak | ................ G06F 13/385 711/103 |
| 2008/0183916 | A1 * | 7/2008 | Bellows | ................ G06F 11/106 710/33 |
| 2013/0077635 | A1 * | 3/2013 | Deivasigamani | ... G06F 13/4045 370/402 |

(Continued)

FOREIGN PATENT DOCUMENTS

| KR | 10-2018-0094113 A | 8/2018 |
|---|---|---|
| KR | 10-2021-0135996 A | 11/2021 |

(Continued)

*Primary Examiner* — Paul R. Myers
(74) *Attorney, Agent, or Firm* — BROADVIEW IP LAW, PC

(57) ABSTRACT

The present disclosure relates to a method for communicating between chiplets in a chiplet system. The chiplet system includes a first chiplet and a second chiplet, and the method includes, by the first chiplet, generating a die-to-die interface flit from a first protocol type transaction based on conversion information, by the first chiplet, transmitting the die-to-die interface flit to the second chiplet, and, by the second chiplet, generating a second protocol type transaction from the die-to-die interface flit based on the conversion information.

18 Claims, 15 Drawing Sheets

(56) References Cited

U.S. PATENT DOCUMENTS

| | | | |
|---|---|---|---|
| 2015/0016046 A1* | 1/2015 | Shaeffer | G06F 13/385 |
| | | | 361/679.32 |
| 2015/0248371 A1* | 9/2015 | Zheng | G06F 15/7825 |
| | | | 710/315 |
| 2016/0026742 A1* | 1/2016 | Schelle | H03K 19/17728 |
| | | | 711/104 |
| 2019/0095377 A1* | 3/2019 | Brown | G06F 13/1673 |
| 2019/0179785 A1* | 6/2019 | Keeth | H01L 23/5385 |
| 2019/0243700 A1* | 8/2019 | Brewer | H04L 69/12 |
| 2020/0133902 A1* | 4/2020 | Tang | G06F 13/4027 |
| 2022/0066969 A1* | 3/2022 | Patrick | G06F 13/4031 |
| 2022/0070089 A1* | 3/2022 | Brewer | H04L 45/586 |
| 2022/0070284 A1* | 3/2022 | Patrick | H04L 69/18 |
| 2022/0222194 A1* | 7/2022 | Chandwani | G06F 13/1663 |
| 2023/0080284 A1 | 3/2023 | Lee | |
| 2023/0123826 A1* | 4/2023 | Magee | H03K 19/1774 |
| | | | 365/233.1 |
| 2023/0162766 A1* | 5/2023 | Jo | G11C 16/08 |
| | | | 365/189.05 |
| 2023/0409332 A1* | 12/2023 | Safranek | G06F 9/3877 |
| 2024/0045827 A1* | 2/2024 | Li | H04L 12/66 |
| 2024/0295989 A1* | 9/2024 | Kavala | G06F 13/4068 |
| 2025/0006642 A1* | 1/2025 | Haba | H01L 25/0655 |

FOREIGN PATENT DOCUMENTS

| | | |
|---|---|---|
| KR | 10-2023-0038082 A | 3/2023 |
| KR | 10-2023-0125324 A | 8/2023 |
| WO | 2017/123284 A1 | 7/2017 |
| WO | 2020/190369 A1 | 9/2020 |
| WO | 2022/149080 A1 | 7/2022 |
| WO | 2023/121812 A1 | 6/2023 |

* cited by examiner

Table 710

| Direction | Name | MSB | LSB | Size (bit-width) |
|---|---|---|---|---|
| A to B | Encoding indicator code | 4 | 0 | 5 |
| A to B | WA | | | |
| A to B | WA | | | |
| A to B | WA | ADDR | 44 | 45 | 40 |
| A to B | WA | Userbit | 53 | 45 | 9 |
| A to B | WA | Region | 54 | 55 | 10 |
| A to B | WA | QOS | 58 | 55 | 4 |
| A to B | WA | Protection | 61 | 59 | 3 |
| A to B | WA | Cache | 65 | 62 | 4 |
| A to B | WA | Burst Length | 69 | 66 | 4 |
| A to B | WA | Burst Size | 71 | 70 | 2 |
| A to B | WA | Burst Type | 74 | 72 | 3 |
| A to B | WD | Lock | 75 | 75 | 1 |
| A to B | WD | Data | 1099 | 76 | 1024 |
| A to B | RA | Userbit | 1109 | 1100 | 10 |
| A to B | RA | ADDR | 1149 | 1110 | 40 |
| A to B | RA | Userbit | 1159 | 1150 | 10 |
| A to B | RA | Region | 1163 | 1160 | 4 |
| A to B | RA | QOS | 1166 | 1164 | 3 |
| A to B | RA | Protection | 1170 | 1167 | 4 |
| A to B | RA | Cache | 1174 | 1171 | 4 |
| A to B | RA | Burst Length | 1176 | 1175 | 2 |
| A to B | RA | Burst Size | 1178 | 1177 | 2 |
| A to B | RA | Burst Type | 1182 | 1179 | 3 |
| A to B | RA | Lock | 1183 | 1183 | 1 |
| A to B | WR | Userbit | 1187 | 1184 | 4 |
| A to B | WR | Data | 2211 | 1188 | 1024 |
| A to B | RD | Userbit | 2221 | 2212 | 10 |
| A to B | RD | | | | |

Table 720

| Direction | Name | MSB | LSB | Size (bit-width) |
|---|---|---|---|---|
| B to A | Encoding indicator code | 4 | 0 | 5 |
| B to A | WR | | 5 | 5 | 1 |
| B to A | WR | Userbit | 10 | 6 | 5 |
| B to A | RD | Data | 1034 | 11 | 1024 |
| B to A | RD | Userbit | 1044 | 1035 | 10 |
| B to A | WA | ADDR | 1084 | 1045 | 40 |
| B to A | WA | Userbit | 1094 | 1085 | 10 |
| B to A | WA | Region | 1098 | 1095 | 4 |
| B to A | WA | QOS | 1101 | 1099 | 3 |
| B to A | WA | Protection | 1105 | 1102 | 4 |
| B to A | WA | Cache | 1109 | 1106 | 4 |
| B to A | WA | Burst Length | 1111 | 1110 | 2 |
| B to A | WA | Burst Size | 1114 | 1112 | 3 |
| B to A | WA | Burst Type | 1115 | 1115 | 1 |
| B to A | WD | Lock | 2139 | 1116 | 1024 |
| B to A | WD | Data | 2149 | 2140 | 10 |
| B to A | RA | Userbit | 2189 | 2150 | 40 |
| B to A | RA | ADDR | 2199 | 2190 | 10 |
| B to A | RA | Userbit | 2203 | 2200 | 4 |
| B to A | RA | Region | 2206 | 2204 | 3 |
| B to A | RA | QOS | 2210 | 2207 | 4 |
| B to A | RA | Protection | 2214 | 2211 | 4 |
| B to A | RA | Cache | 2216 | 2215 | 2 |
| B to A | RA | Burst Length | 2218 | 2217 | 2 |
| B to A | RA | Burst Size | 2221 | 2219 | 3 |
| B to A | RA | Burst Type | | | |
| B to A | RA | Lock | | | |

FIG. 7

| Direction | Name | | MSB | LSB | Size (bit-width) |
|---|---|---|---|---|---|
| A to B | Encoding indicator code | | 4 | 0 | 5 |
| A to B | TDATA | | 1028 | 5 | 1024 |
| A to B | TSTRB | | 1156 | 1029 | 128 |
| A to B | TKEEP | | 1284 | 1157 | 128 |
| A to B | TLAST | | 1285 | 1285 | 1 |
| A to B | TID | | 1293 | 1286 | 8 |
| A to B | TDEST | | 1301 | 1294 | 8 |
| A to B | TUSER | | 1311 | 1302 | 10 |
| A to B | TWAKEUP | | 1312 | 1312 | 1 |

| | Validity | | | | |
|---|---|---|---|---|---|
| | WA | WD | RA | WR | RD |
| 5b0_0000 | - | - | - | - | - |
| 5b0_0001 | - | - | - | - | Valid |
| 5b0_0010 | - | - | - | Valid | - |
| 5b0_0100 | - | - | Valid | - | - |
| 5b0_1000 | - | Valid | - | - | - |
| 5b1_0000 | Valid | - | - | - | - |
| 5b0_0011 | - | - | - | Valid | Valid |
| ... | | | | | |
| 5b1_1111 | Valid | Valid | Valid | Valid | Valid |

| Header (Packet ID + Payload type + Size) | | Payload Data |
|---|---|---|
| ID (L bits) | Payload size (N bits) | |
| Write addr code (M bits) | Payload size | Payload Data – Write address (2^(N-1) Bytes) |
| Write data code | Payload size | Payload Data – Write data |
| Write response code | Payload size | Payload Data – Write response data |
| Read address code | Payload size | Payload Data – Read address |
| Read data code | Payload size | Payload Data – Read data |

CHIPLET SYSTEM AND METHOD FOR COMMUNICATING BETWEEN CHIPLETS IN CHIPLET SYSTEM

CROSS-REFERENCE TO RELATED APPLICATION

This application claims priority under 35 U.S.C. § 119 to Korean Patent Application No. 10-2023-0114968, filed in the Korean Intellectual Property Office on Aug. 30, 2023, and Korean Patent Application No. 10-2023-0181259, filed in the Korean Intellectual Property Office on Dec. 13, 2023, the entire contents of which are hereby incorporated by reference.

BACKGROUND

Technical Field

The present disclosure relates to a chiplet system and a method for communicating between chiplets in a chiplet system.

Description of the Related Art

As the demand for high performance and miniaturization of semiconductor devices and electronic products using the semiconductor devices increases, various package technologies related to semiconductor devices are being developed. In recent years, along with the development of these technologies, packaging technologies using chiplets have recently been developed.

Chiplet system may refer to a system that is provided by, rather than configuring chips performing various functions on one die (or substrate), dividing the chips in units of functionalities, configuring the divided chips on each of a plurality of dies (chiplet), and packaging them into one system. That is, the chiplet system was developed to overcome the limitations of existing monolithic chips, and the dies in the package may be connected to each other through a silicon interposer and
  the chiplets in the chiplet system communicate with each
    other according to a die-to-die communication standard
    such as universal chiplet interconnect express (UCIe).

Meanwhile, the detailed configurations of each of the plurality of dies (chiplets) included in the chiplet system may be different from each other, and in this case, there is a problem that communication between a plurality of dies (chiplets) cannot be performed normally even if the standard communication standard is utilized. Accordingly, in designing the chiplet system, there is a need for a method that can configure the chiplet system regardless of the detailed configuration of each of the plurality of chiplets.

SUMMARY

In order to solve one or more problems (e.g., the problems described above and/or other problems not explicitly described herein), the present disclosure provides a chiplet system and a method for communicating between chiplets in the chiplet system.

According to some examples, a method for communicating between chiplets in a chiplet system, in which the chiplet system may include a first chiplet and a second chiplet, may include, by the first chiplet, generating a die-to-die interface flit from a first protocol type transaction based on conversion information, by the first chiplet, transmitting the die-to-die interface flit to the second chiplet, and, by the second chiplet, generating a second protocol type transaction from the die-to-die interface flit based on the conversion information.

In some examples, the first chiplet further may include a bus system, the receiving the first data may include receiving the first data through the bus system, the first data may include a first protocol type transaction associated with the first chiplet, the conversion information may include encoding information associated with a second protocol, in which the second protocol may be associated with the second chiplet, and the second data may include a payload of a first die-to-die interface flit associated with the second protocol.

In some examples, the first chiplet may further include a physical (PHY) layer, and the transmitting by the first chiplet the die-to-die interface flit to the second chiplet may include, by the adapter layer of the first chiplet, transmitting the die-to-die interface flit to the PHY layer of the first chiplet, and, by the PHY layer of the first chiplet, transmitting the die-to-die interface flit to the second chiplet.

In some examples, before generating the die-to-die interface flit, may further include, by the first chiplet and the second chiplet, exchanging the conversion information.

In some examples, the conversion information may further include information on a packet ID, a payload type code, a payload type size, and a payload size.

In some examples, the payload type code may include a write address code, a write data code, a write response code, a read address code, and a read data code.

In some examples, the second chiplet may include a PHY layer, and the transmitting by the first chiplet the die-to-die interface flit to the second chiplet may include, by the first chiplet, transmitting the die-to-die interface flit to the PHY layer of the second chiplet.

In some examples, the second chiplet may include a controller including an adapter layer and a protocol layer, and the generating by the second chiplet the second protocol type transaction from the die-to-die interface flit based on the conversion information may include, by the adapter layer of the second chiplet, extracting a payload of the die-to-die interface flit from the flit, and, by the protocol layer of the second chiplet, generating the second protocol type transaction from the payload.

In some examples, the first protocol may relate to the first chiplet, the second protocol may relate to the second chiplet, and the first protocol and the second protocol may be different from each other.

In some examples, the first chiplet and the second chiplet may be designed based on universal chiplet interconnect express (UCIe) standard, and the die-to-die interface flit may include a UCIe flit.

According to some examples, a chiplet system, in which the chiplet system may include a first chiplet and a second chiplet, the first chiplet may be configured to generate a die-to-die interface flit from a first protocol type transaction based on conversion information, and transmit the die-to-die interface flit to the second chiplet, and the second chiplet may be configured to generate a second protocol type transaction from the die-to-die interface flit based on the conversion information.

In some examples, the first chiplet may include a controller including a protocol layer and an adapter layer, and the generating the die-to-die interface flit from the first protocol type transaction based on the conversion information may include, by the protocol layer of the first chiplet, generating a payload of the die-to-die interface flit from the first protocol type transaction based on the conversion information, by the adapter layer of the first chiplet, generating a header of the die-to-die interface flit, and, by the adapter layer of the first chiplet, generating the die-to-die interface flit by combining the header and the payload.

In some examples, the first chiplet may further include a PHY layer, and the transmitting the die-to-die interface flit to the second chiplet may include, by the adapter layer of the first chiplet, transmitting the die-to-die interface flit to the PHY layer of the first chiplet, and, by the PHY layer of the first chiplet, transmitting the die-to-die interface flit to the second chiplet.

In some examples, before generating the die-to-die interface flit, the first chiplet and the second chiplet may exchange the conversion information.

In some examples, the conversion information may further include information on a packet ID, a payload type code, a payload type size, and a payload size.

In some examples, the payload type code may include a write address code, a write data code, a write response code, a read address code, and a read data code.

In some examples, the second chiplet may include a PHY layer, and the transmitting the die-to-die interface flit to the second chiplet may include transmitting the die-to-die interface flit to the PHY layer of the second chiplet.

In some examples, the second chiplet may include a controller including an adapter layer and a protocol layer, and the generating the second protocol type transaction from the die-to-die interface flit based on the conversion information may include, by the adapter layer of the second chiplet, extracting a payload of the die-to-die interface flit from the flit, and, by the protocol layer of the second chiplet, generating a second protocol type transaction from the payload.

In some examples, the first protocol may relate to the first chiplet, the second protocol may relate to the second chiplet, and the first protocol and the second protocol may be different from each other.

In some examples, the first chiplet and the second chiplet may be designed based on the universal chiplet interconnect express (UCIe) standard, and the die-to-die interface flit may include a UCIe flit.

According to various aspects of the present disclosure, at least one chiplet included in the chiplet system may include a conversion device that converts data based on conversion information (e.g., encoding information, decoding information) received from a partner chiplet. Accordingly, interoperability can be improved compared to a chiplet system that is capable of converting only a predetermined number of protocols. In addition, each configuration of the chiplet may be designed independently regardless of the configuration of the partner chiplet in the chiplet system.

According to various aspects of the present disclosure, a chiplet system may be configured, which is capable of encoding and decoding data based on the same conversion information, thereby enabling communication between chiplets adopting different protocols. Accordingly, interoperability can be improved compared to a chiplet system that is capable of converting only a predetermined number of protocols. In addition, each configuration of the chiplet can be designed independently regardless of the configuration of the partner chiplet in the chiplet system.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

The above and other objects, features and advantages of the present disclosure will be described with reference to the accompanying drawings described below, where similar reference numerals indicate similar elements, but not limited thereto, in which:

FIG. 7 is a diagram provided to explain conversion information;

FIG. 8 is a diagram provided to explain conversion information associated with a uni-directional protocol;

FIG. 9 is a diagram provided to explain an indicator code;

FIG. 11 is a diagram provided to explain conversion information;

DETAILED DESCRIPTION

Figure 1:
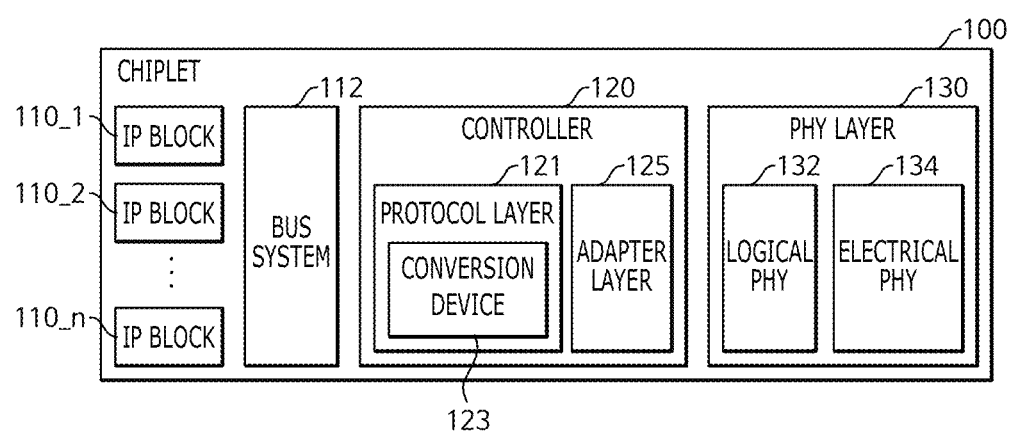
FIG. 1 is a diagram provided to explain a configuration of a chiplet.

Hereinafter, example details for the practice of the present disclosure will be described in detail with reference to the accompanying drawings. However, in the following description, detailed descriptions of well-known functions or configurations will be omitted if it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and this may be altered according to the intent of an operator skilled in the art, related practice, or introduction of new technology. In addition, in specific cases, certain terms may be arbitrarily selected by the applicant, and the meaning of the terms will be described in detail in a corresponding description of the example(s). Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended as meaning that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to play one or more processors. Accordingly, as an example, the "module" or "unit" may include components such as software components, object-oriented software components, class components, and task components, and at least one of processes, functions, attributes, procedures, subroutines, program code segments, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory. The "processor" should be interpreted broadly to encompass a general-purpose processor, a Central Processing Unit (CPU), a microprocessor, a Digital Signal Processor (DSP), a controller, a microcontroller, a state machine, and so forth. Under some circumstances, the "processor" may refer to an application-specific integrated circuit (ASIC), a programmable logic device (PLD), a field-programmable gate array (FPGA), etc. The "processor" may refer to a combination for processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or marking data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In addition, the expression "each of a plurality of A" may refer to each of all components included in the plurality of A, or may refer to each of some of the components included in a plurality of A.

Hereinafter, various examples of the present disclosure will be described in detail with reference to the accompanying drawings.

FIG. 1 is a diagram provided to explain a configuration of a chiplet. In FIG. 1, a chiplet 100 may be at least one chiplet included in a chiplet system. In addition, the chiplet 100 may include a plurality of IP blocks 110_1 to 110_n, a bus system 112, a controller 120, and a physical (PHY) layer 130.

The plurality of IP blocks 110_1 to 110_n may be reusable logics, cells, and/or units of integrated circuit layout design. Each of the plurality of IP blocks 110_1 to 110_n may be designed to perform a specific function and functionally combined to implement a complex multifunctional SoC. For example, an IP block may include a processor core, a memory block, a digital signal processor (DSP), a peripheral interface, a graphics device (GPU), an analog block, a communication block, a security block, a power management device, etc.

The bus system 112 may serve as a passage for transmitting data and/or control signals. The bus system 112 may serve to connect between the plurality of IP blocks 110_1 to 110_n or connect to another configuration (e.g., the controller 120, etc.) of a chiplet 110. In addition, the bus system 112 may use specific bus protocols (e.g., AXI3, AXI4, APB, CXS.B, DDR, etc.) for data transmission and reception between components.

The controller 120 may perform a function of managing and coordinating communication and interaction between chiplets. This allows the controller 120 to process tasks such as data transmission, synchronization, and/or power management between a plurality of chiplets included in the chiplet system to control the chiplets to operate as a consistent system. The controller 120 may include a protocol layer 121 and an adapter layer 125.

The protocol layer 121 may determine a method of formatting and encoding data for data transmission between chiplets. The protocol layer 121 may support a plurality of protocols for maximizing efficiency and reducing latency. For example, the protocol layer 121 may support any protocol supported in the chiplet system, such as PCI non-Flit/Flit Mode, CXL 68B/256B Flight Mode, Streaming Protocol, etc., but is not limited thereto.

The protocol layer 121 may include a conversion device 123 for implementing a protocol independent chiplet system. The conversion device 123 may include an encoder that generates a payload of a die-to-die interface flit from the received transaction and/or a decoder that generates a transaction from the payload of the received die-to-die interface flit. This will be described in more detail below with reference to FIGS. 4 and 5.

The adapter layer 125 may serve to convert a communication interface between a plurality of chiplets in the chiplet system. For example, the adapter layer 125 may perform a link management function, a protocol arbitration and negotiation function, an optional error correction function (e.g., CRC, etc.).

The PHY layer 130 may process physical transmission of data between chiplets. For example, the PHY layer 130 may be in charge of hardware processing related to data transmission, such as signal transmission and reception, modulation and demodulation, conversion between digital bits, etc. The PHY layer 130 may include a logical PHY 132 and an electrical PHY 134. The logical PHY 132 may be in charge of logical processing of the PHY layer 130. For example, the logical PHY 132 may perform functions such as serialization and deserialization (SerDes), clock data recovery and data transmission preparation, interpretation of received data, etc. The electrical PHY 134 may be in charge of electrical processing of the PHY layer 130. For example, the electrical PHY 134 may process matters related to the characteristics of the electrical signal (e.g., voltage, signal integrity, etc.).

The respective components of the chiplet 100 are shown in FIG. 1 to illustrate functional components that can be divided on the basis of functions, and in the actual physical environment, a plurality of components may be implemented as being integrated with each other. In addition, the chiplet 100 may not include at least one of the components described above, and may further include at least one other component.

Figure 2:
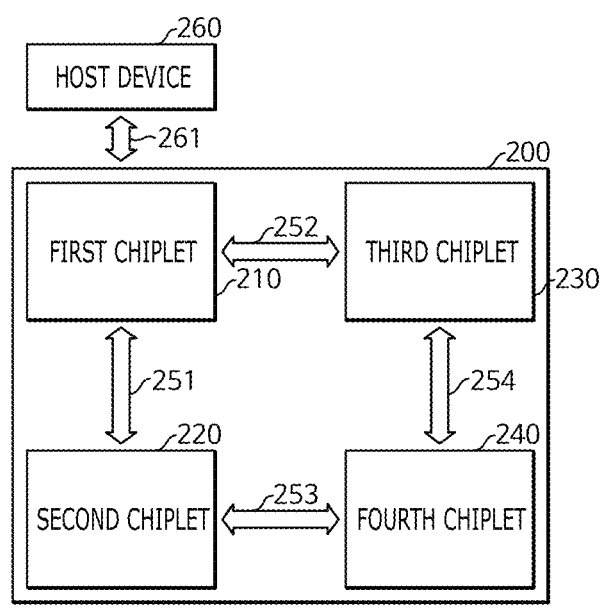
FIG. 2 is a diagram provided to explain a configuration of a chiplet system including a plurality of chiplets.

FIG. 2 is a diagram provided to explain a configuration of a chiplet system 200 including a plurality of chiplets 210, 220, 230, and 240. Referring to FIG. 2, the chiplet system 200 may include a plurality of chiplets. For example, the chiplet system 200 may include a first chiplet 210, a second chiplet 220, a third chiplet 230, and a fourth chiplet 240. However, the number of chiplets included in the chiplet system 200 is not limited to the above. According to various aspects, the chiplet system 200 may not include at least one of the chiplets described above, and may further include at least one other chiplet. The chiplet system 200 including a plurality of chiplets may be packaged, and thus may be referred to as a package device or an electronic device.

The plurality of chiplets may be connected to each other through a first interface. For example, the first chiplet 210 and the second chiplet 220 may be connected through an interface (1-1) 251, the first chiplet 210 and the third chiplet 230 may be connected through an interface (1-2) 252, the second chiplet 220 and the fourth chiplet 240 may be connected through an interface (1-3) 253, and the third chiplet 230 and the fourth chiplet 240 may be connected through an interface (1-4) 254. The first interface may refer to a die-to-die interface, and may include UCIe etc., for example.

Any one (e.g., the first chiplet 210) of the plurality of chiplets may be connected to an external device (e.g., a host device 260) through a second interface 261. In this case, the other chiplets (e.g., the second chiplet 220, the third chiplet 230, and the fourth chiplet 240) may be restricted from communicating with the external device. A chiplet (e.g., the first chiplet 210) communicating with the external device may be referred to as a main chiplet, a primary die, a base chiplet, etc., and the other chiplets (e.g., the second chiplet 220, the third chiplet 230, the fourth chiplet 240) with limited communication with the external device may be referred to as a sub-chiplet, a secondary die, a partner chiplet, etc. For example, the second interface 261 may refer to a host interface, and may include a peripheral component interconnect express (PCIe), etc.

The chiplet system 200 including a plurality of chiplets may expand the functions of the host device 260 (or the host system) and perform parallel processing on at least some functions. For example, the host device 260 may manage the chiplet system and distribute tasks related to at least some functions to the chiplet system, and the chiplet system may process the distributed tasks in parallel. This enables to not only optimize and enhance the performance of the entire system including the host device 260 and the chiplet system, but also provide a scalable computing environment. The chiplet system may perform functions of a multi-processor, a memory controller, a cache, a network interface, etc.

Figure 3:
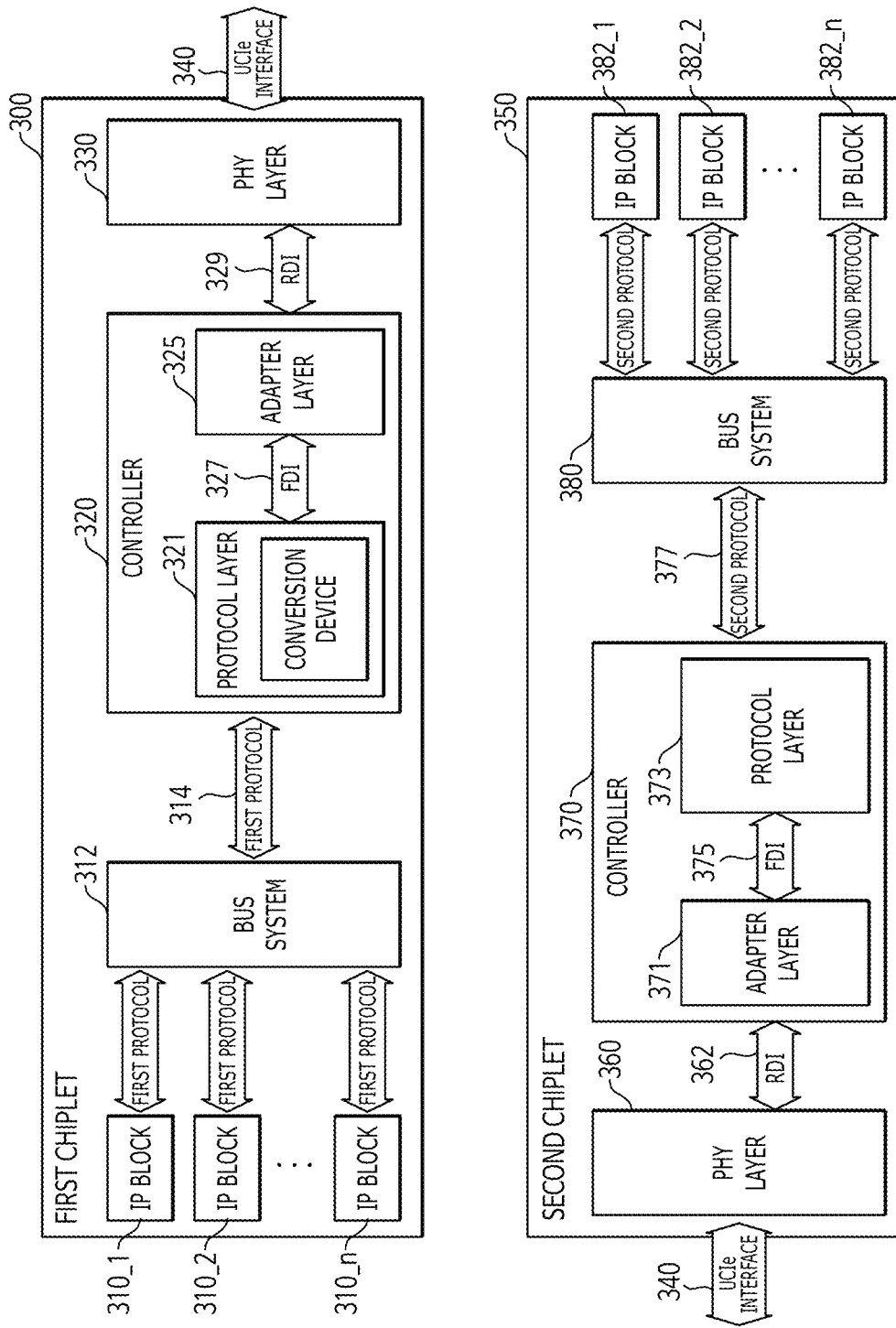
FIG. 3 is a diagram provided to explain a method for communicating between chiplets.

FIG. 3 is a diagram provided to explain a method for communicating between chiplets. In FIG. 3, a first chiplet 300 and a second chiplet 350 may be chiplets in the same chiplet system. In the following description, a description for a configuration that is the same as or similar to the configuration already described above in FIG. 1 may be omitted.

The first chiplet 300 may use a first protocol type as a bus protocol, and the second chiplet 350 may use a second protocol type as a bus protocol. In this case, the first protocol type and the second protocol type may be different from each other, or may be the same protocol with different detailed parameters (e.g., AxSIZE, AxLen, number of user bits, etc.). For example, the first protocol type may be AXI3, and the second protocol type may be AXI4. As another example, the first protocol type may be AXI4 with 40 user bits, and the second protocol type may be AXI4 with 20 user bits.

A plurality of IP blocks 310_1 to 310_n and a controller 320 of the first chiplet 300 may transmit and receive data to and from each other through a bus system 312. For example, a protocol layer 321 of the controller 320 may receive first protocol type transactions 314 from the plurality of IP blocks 310_1 to 310_n of the first chiplet through the bus system 312, and a conversion device 323 included in the protocol layer 321 may encode the transactions 314 to generate a payload of a die-to-die interface flit. As another example, the protocol layer 321 of the controller 320 may transmit the first protocol type transaction 314 decoded by the conversion device 323 to the plurality of IP blocks 310_1 to 310_n through the bus system 312. In this case, the die-to-die interface flit may be a UCIe flit.

The protocol layer 321 and an adapter layer 325 may transmit and receive data through a flit-aware die-to-die interface (FDI) 327. The FDI 327 may refer to an interface that recognizes and manages data in units of flits when transmitting the data. For example, the protocol layer 321 may transmit a payload of a die-to-die interface flit generated by the conversion device 323 to the adapter layer 325 through the FDI 327. As another example, the protocol layer 321 may receive the payload of the die-to-die interface flit extracted from the adapter layer 325 through the FDI 327.

The controller 320 and a PHY layer 330 may transmit and receive data through a raw die-to-die interface (RDI) 329. The RDI 329 may refer to an interface that directly transmits data without complex data processing or processing for the simplification of data transmission and minimized latency. For example, the adapter layer 325 of the controller 320 may generate a header and a trailer of a die-to-die interface flit, combine the same with a payload to generate a die-to-die interface flit, and transmit the generated die-to-die interface flit to the PHY layer 330 through the RDI 329. As another example, the PHY layer 330 may transmit a die-to-die interface flit received from the second chiplet 350 to the adapter layer 325 through the RDI 329.

The first chiplet 300 and the second chiplet 350 may transmit and receive data to and from each other through a UCIe interface 340. For example, the first chiplet 300 and the second chiplet 350 may transmit and receive die-to-die interface flits to and from each other through the UCIe interface 340. FIG. 3 illustrates the UCIe interface 340 as an example of the interface connecting the first chiplet 300 and the second chiplet 350, but aspects are not limited thereto, and various die-to-die interfaces (e.g., High-Bandwidth Interconnect (HBI), Bunch of Wires (BoW), extra-short reach (XSR), etc.) may be utilized.

Likewise, a PHY layer 360 and a controller 370 of the second chiplet 350 may transmit and receive data to and from each other through a RDI 362. In addition, an adapter layer 371 and a protocol layer 373 of the controller 370 may transmit and receive data to and from each other through an FDI 375. The controller 370 and a plurality of IP blocks 382_1 to 382_n of the second chiplet 350 may transmit and receive a second protocol type transaction 377 to and from each other through a bus system 380.

Unlike the protocol layer 373 of the second chiplet 350, the protocol layer 373 of the first chiplet 300 may include the conversion device 323. The conversion device 323 may receive conversion information (encoding information) from the protocol layer 373 of the second chiplet 350 and generate a payload of the first die-to-die interface flit from the transaction 314 of the first protocol type. In addition, the conversion device 323 may receive conversion information (decoding information) from the protocol layer 373 of the second chiplet and generate the first protocol type transaction 314 from the payload of the second die-to-die interface flit transmitted from the second chiplet 350. This will be described in more detail below with reference to FIGS. 4 and 5. In FIG. 3, the conversion device 323 illustrates the functional elements for performing encoding and decoding, and is not limited to any specific implementation method. For example, the conversion device 323 may be a hardware device including a converter that performs encoding and decoding and a register that stores encoding information and decoding information. As another example, the conversion device 323 may be software that performs encoding and decoding.

As described above, at least one chiplet included in the chiplet system may include a conversion device that converts data based on conversion information (e.g., encoding information and/or decoding information) received from the partner chiplet. Accordingly, interoperability can be improved compared to a chiplet system that is capable of converting only a predetermined number of protocols. In addition, each configuration of the chiplet can be designed independently regardless of the configuration of the partner chiplet in the chiplet system.

Figure 4:
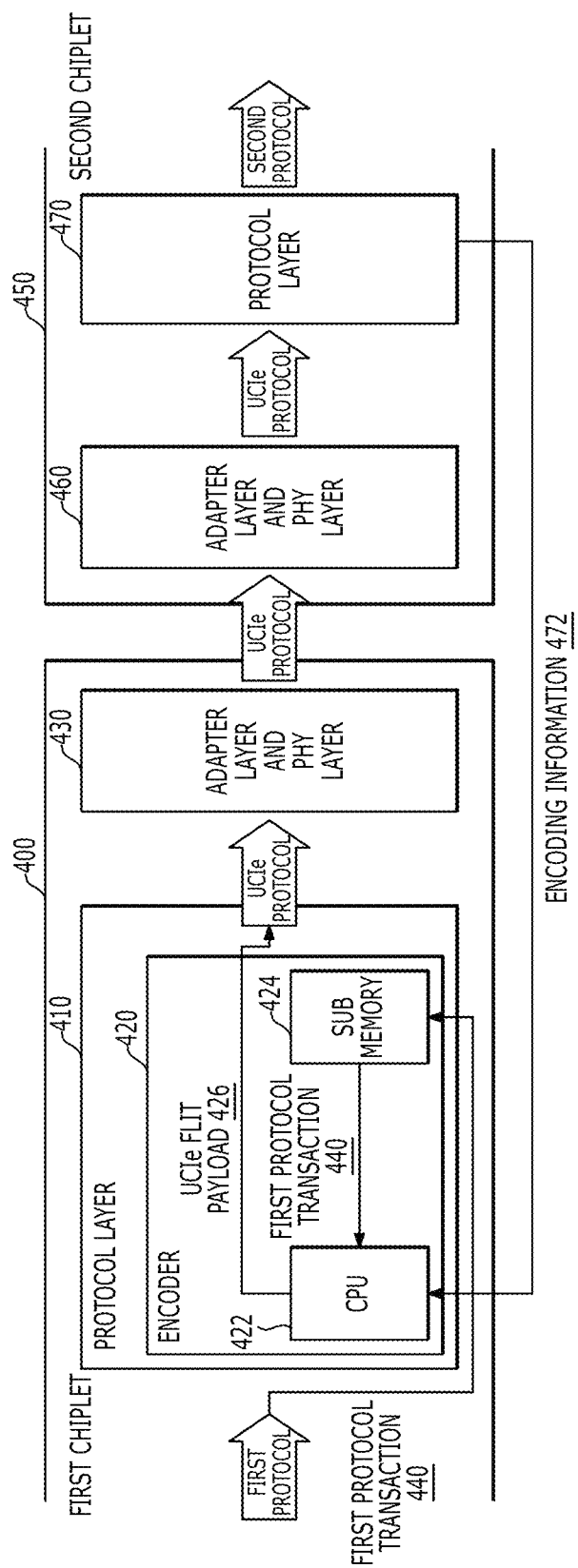
FIG. 4 is a diagram provided to explain a method for transmitting a first protocol type transaction of a first chiplet to a second chiplet.

FIG. 4 is a diagram provided to explain a method for transmitting a first protocol type transaction 440 of a first chiplet 400 to a second chiplet 450. Referring to FIG. 4, a protocol layer 410 of the first chiplet 400 may include an encoder 420 that is a conversion device, and the encoder 420 may include a CPU 422 and a sub-memory 424.

The sub-memory 424 may receive and store the transaction 440 from a plurality of IP blocks (not illustrated) through a bus system (not illustrated) of the first chiplet 400. The sub-memory 424 may transmit the stored transaction 440 to the CPU 422.

The CPU 422 may generate a payload 426 of a UCIe flit associated with the second protocol from the transaction 440. For example, the CPU 422 may map information included in the transaction 440 according to a specific bit order to generate the payload 426. In this case, the bit order may refer to a bit order in which the second chiplet using the second protocol may generate a second protocol type transaction from the payload 426 without additional decoding operation. To this end, the CPU 422 may receive encoding information 472 from the second chiplet. For example, the CPU 422 may receive the encoding information 472 from a protocol layer 470 of the second chiplet.

The encoding information 472 may include information associated with the second protocol of the second chiplet. For example, the encoding information 472 is a protocol between the payload 426 of the second chiplet and the second protocol type transaction, and may include information on one or more bus channels of the second chiplet, regions and sizes of bits allocated to each of one or more bus channels of the second chiplet, an indicator code indicating an operable bus channel of one or more bus channels of the second chiplet, etc. For example, the encoding information 472 refers to information encoded in the first chiplet, and may include information used for decoding in the protocol layer 470 of the second chiplet. As another example, the encoding information 472 may include information encoded and/or decoded according to the second protocol of the second chiplet. In addition, the encoding information 472 may be utilized in both directions, and thus may be the same as decoding information 518 of FIG. 5, which will be discussed below. A detailed example of the encoding information 472 will be described below with reference to FIG. 7.

The CPU 422 may determine an encoding rule (e.g., a rule for mapping data according to a specific bit order) based on the received encoding information 472, and may generate the payload 426 of a UCIe flit by encoding the transaction 440 according to the determined encoding rule. The CPU 422 may transmit the payload 426 of the UCIe flit to the adapter layer and a PHY layer 430 through the UCIe protocol. The adapter layer may generate a header and a trailer of the UCIe flit, and may combine the same with the payload 426 to generate a UCIe flit. The UCIe flit generated in this way may be transmitted to the second chiplet 450 through the PHY layer, and the UCIe protocol may also be utilized in this process.

The adapter layer and a PHY layer 460 of the second chiplet may receive the UCIe flit from the first chiplet 400. The adapter layer may extract the payload from the received UCIe flit, and transmit the extracted payload to the protocol layer 470 of the second chiplet 450 through the UCIe protocol. Because the payload of the UCIe flit is generated based on the encoding information 472, it may be associated with the second protocol, and accordingly, the protocol layer 470 may generate a second protocol type transaction from the payload of the UCIe flit without additional operations (e.g., decoding, etc.). The protocol layer 470 may transmit a second protocol type transaction to the IP block (not illustrated) of the second chiplet 450 through a bus system (not illustrated).

Although FIG. 4 illustrates that UCIe flit and the UCIe protocols are utilized to transmit the transaction 440 of the first protocol type of the first chiplet 400 to the second chiplet 450, aspects are not limited thereto, and various die-to-die connection standards (e.g., HBI, BoW, XSR, etc.) may be utilized.

Although FIG. 4 illustrates the adapter layer and the PHY layers 430 and 460 as one block, aspects are not limited thereto, and each of the adapter layer and the PHY layers 430 and 460 may be implemented as separate layers.

Figure 5:
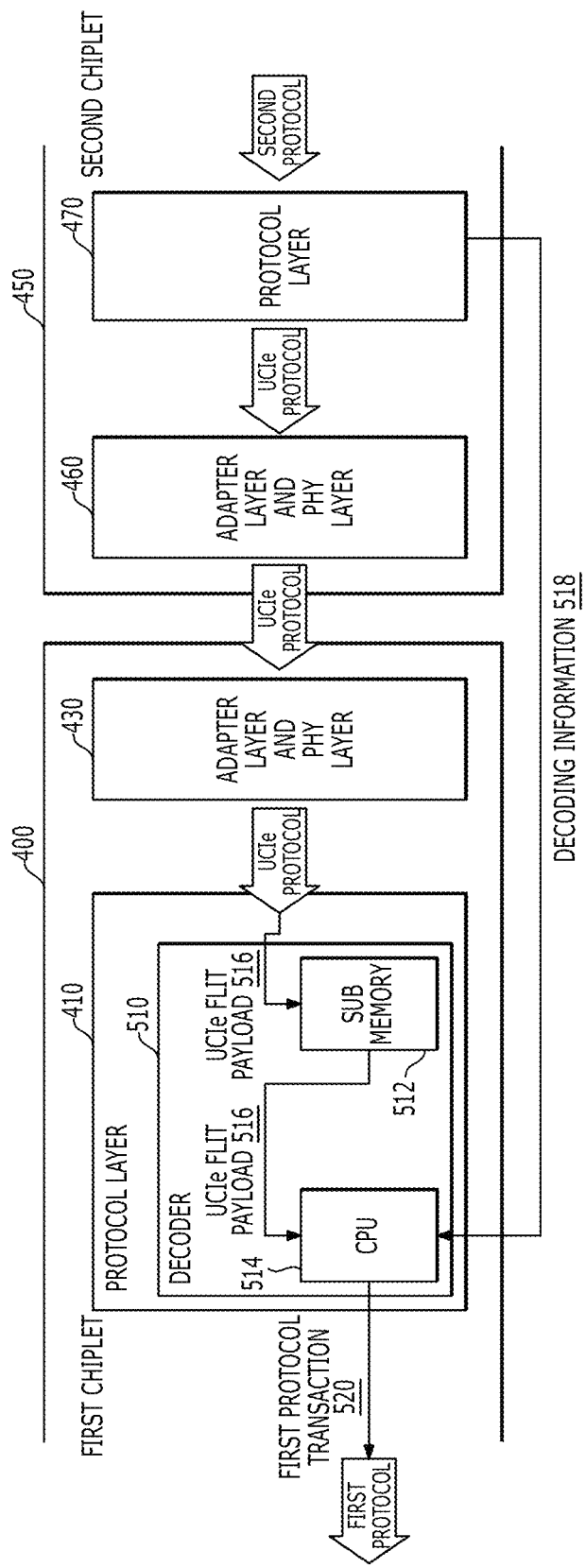
FIG. 5 is a diagram provided to explain a method for transmitting a second protocol type transaction of the second chiplet to the first chiplet.

FIG. 5 is a diagram provided to explain a method for transmitting a second protocol type transaction of the second chiplet 450 to the first chiplet 400. Referring to FIG. 5, the protocol layer 410 of the first chiplet 400 may include a decoder 510 which is a conversion device, and the decoder 510 may include a sub-memory 512 and a CPU 514.

The protocol layer 470 of the second chiplet may receive second protocol type transactions from a plurality of IP blocks (not illustrated) through a bus system (not illustrated). The protocol layer 470 may generate a payload of a UCIe flit associated with the second protocol from the second protocol type transactions, and may transmit the payload to the adapter layer and the PHY layer 460 of the second chiplet 450 through the UCIe protocol. The adapter layer of the second chiplet may generate a header of the UCIe flit and a trailer of the UCIe flit, and combine them with the payload to generate a UCIe flit. The generated UCIe flit may be transmitted to the first chiplet 400 through the PHY layer, and the UCIe protocol may also be utilized in this process.

The adapter layer and the PHY layer 430 of the first chiplet 400 may receive a UCIe flit from the second chiplet 450. The adapter layer may extract a payload from the received UCIe flit, and transmit the extracted payload to the protocol layer 410 of the first chiplet 400 through the UCIe protocol.

The sub-memory 512 may receive a payload 516 of the UCIe flit from the adapter layer of the first chiplet 400 and store the same. The sub-memory 512 may transmit the stored payload 516 to the CPU 514.

The CPU 514 may generate a first protocol type transaction 520 from the payload 516 of the UCIe flit. For example, the CPU 514 may decode the payload 516 mapped with the data according to a specific bit order to generate the first protocol type transaction 520. To this end, the CPU 514 may receive the decoding information 518 from the second chiplet. For example, the CPU 514 may receive the decoding information 518 from the protocol layer 470 of the second chiplet.

The decoding information 518 may include information associated with the second protocol of the second chiplet. For example, the decoding information 518 is a protocol between the payload 516 of the second chiplet and the second protocol type transaction, and may include information on one or more bus channels of the second chiplet, regions and sizes of bits allocated to each of one or more bus channels of the second chiplet, an indicator code indicating an operable bus channel of one or more bus channels of the second chiplet, etc. For example, the decoding information 518 refers to information used for decoding in the first chiplet, and may include information used for encoding in the protocol layer 470 of the second chiplet. As another example, the decoding information 518 may include information encoded and/or decoded according to the second protocol of the second chiplet. In addition, the decoding information 518 may be utilized in both directions, and thus may be the same as the encoding information 472 of FIG. 4 described above. A detailed example of the decoding information 518 will be described below with reference to FIG. 7.

The CPU 514 may determine a decoding rule (e.g., for decoding data included in a payload according to a specific bit order, etc.) based on the received decoding information 518, and generate the first protocol type transaction 520 by decoding the payload 516 of the UCIe flit associated with the second protocol according to the determined decoding rule. The CPU 514 may transmit the transaction 520 to an IP block (not illustrated) of the first chiplet 400 through a bus system (not illustrated).

Although FIG. 5 illustrates the adapter layer and the PHY layers 430 and 460 as one block, aspects are not limited thereto, and each of the adapter layer and the PHY layers 430 and 460 may be implemented as separate layers.

Although FIG. 5 illustrates that UCIe flit and UCIe protocols are utilized to transmit the second protocol type transaction of the second chiplet 450 to the first chiplet 400, aspects are not limited thereto, and various die-to-die connection standards (e.g., HBI, BoW, XSR, etc.) may be utilized.

Figure 6:
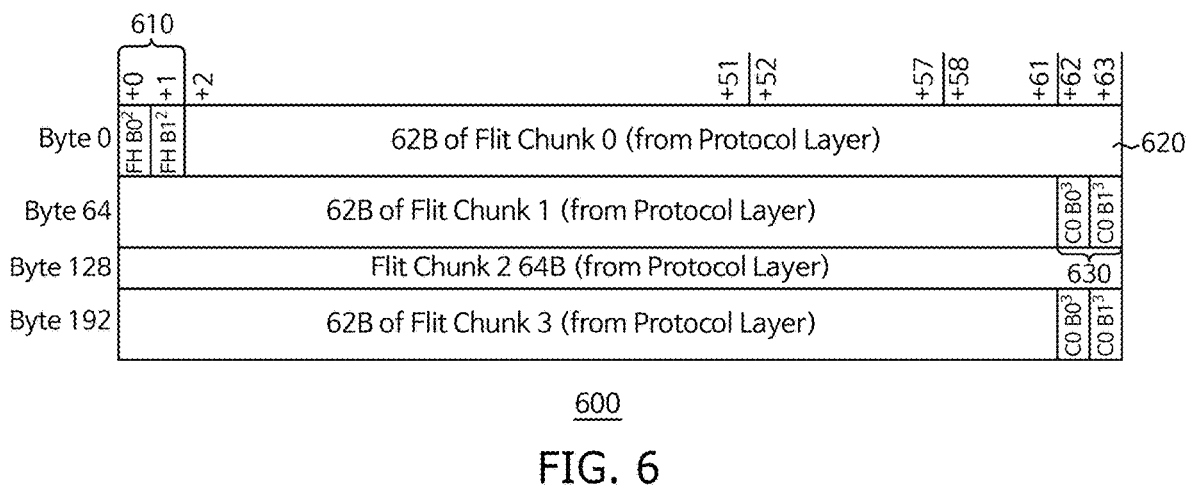
FIG. 6 is a diagram provided to explain a format of a die-to-die interface flit.

FIG. 6 is a diagram provided to explain a format of a die-to-die interface flit 600. A plurality of chiplets in the chiplet system may be designed based on the UCIe standard. A plurality of chiplets in the chiplet system may be connected to each other using a UCIe interface as a die-to-die interface. The protocol layer of each of the plurality of chiplets in the chiplet system may support the UCIe standard flit-based protocol mode (e.g., PCIe non-Flit/Flit Mode, CXL 68B/256B Fleet Mode, Streaming Protocol, etc.), and each protocol mode may support a plurality of protocol modes (e.g., Raw, 68B, Standard 256B Start/End Header, Latency-Optimized 256B w/or w/o Optional Bytes). Through this, each of the plurality of chiplets in the chiplet system can perform a die-to-die interface operation by configuring protocols supported by the protocol layer into flits suitable for each protocol and transmitting and receiving them through the UCIe interface.

In FIG. 6, the die-to-die interface flit 600 may be a flit generated by a chiplet designed based on the UCIe standard. The flit 600 may include a header 610, a payload 620, and a trailer 630.

The header 610 is positioned at the front end of the data packet and may include control information necessary for data transmission. For example, the header 610 may include addresses of destination and departure of a data packet, a priority level, a packet length, order information, etc. In addition, the header 610 may include various metadata for processing packets correctly in the network. For example, the header 610 may include routing information, timestamp, protocol information, etc. The header 610 may assist the chiplet to correctly recognize the packet and process the packet in an appropriate manner. The header 610 may be generated by an adapter layer of a chiplet and combined with the payload 620 and the trailer 630 to be described below.

The payload 620 may be positioned next to the header 610 of the flit 600 and may include actual data to be transmitted. For example, the payload 620 may include data on transactions transmitted and received between chiplets in the chiplet system, and may include a write address (WA), a write data (WD) to be written to the memory, a read address (RA) to read data, a write response (WR), etc. Each protocol layer of a plurality of chiplets in the chiplet system may generate the payload 620 by mapping the data described above according to a specific bit order to transmit a transaction to another chiplet, and the bit order may vary depending on the type of bus protocol in use.

The trailer 630 may be positioned at the end of the flit 600, and may include information for error detection and correction, end of packet indicating information, or other control information. For example, the trailer 630 may include an error check code (e.g., CRC, checksum, etc.) used for verifying if data arrives accurately without errors in the transmission process. Like the header 610, the trailer 630 may be generated in the adapter layer of the chiplet.

There may be a plurality of headers 610, payloads 620, and trailers 630 in the flit 600 or some may be omitted. For example, as illustrated in FIG. 6, the flit 600 may have new payload and trailer positioned next to the trailer 630. In addition, although FIG. 6 illustrates an example of a die-to-die interface flit format, aspects are not limited thereto, and various types of flit formats may be used. The configuration of the flit 600 may also be variously changed according to the flit format.

FIG. 7 is a diagram provided to explain conversion information. The conversion information may refer to information utilized by the conversion device included in the protocol layer of the chiplet. For example, the conversion information may be information utilized by the encoder to encode, from the first protocol type transaction, the payload of the die-to-die interface flit associated with the second protocol. As another example, the conversion information may be information utilized by the decoder to decode the payload of the die-to-die interface flit associated with the second protocol. The conversion information may be received from a partner chiplet (e.g., a protocol layer of a partner chiplet, etc.) using the second protocol.

A first table 710 illustrated in FIG. 7 represents an example of encoding information. As illustrated, the encoding information may be a mapping table including, as labels, a transaction transmission direction (Direction), a name (Name) of data mapped to a payload of a die-to-die interface flit, bit regions (MSB, LSB) of mapped data and bit size (Size), and may include information on one or more bus channels of a partner chiplet, and information indicating a region and a size of a bit allocated to each channel. For example, the encoding information may include write address data (WA), which is data to be transmitted as information on the write address channel, and the names of detail data included in the write address data (e.g., ADDR, User, Region, QOS, Protection, Cache, Burst Length, Burst Size, Burst Type, Lock, etc.), and the bit region and bit size to which the detail data is mapped. In this case, the detail data may include a specific memory address (ADDR) for the task, a user-defined bit (Userbit) used for the task, a specific region (Region) of memory in which the task takes place, priority or quality of service (QOS) defined for the task, a security mechanism (Protection) for the task, a cache related to the task, a length of data block transmitted at a time when the task is performed, a total amount of data (Burst Size) of data transmitted when the task is performed, a type of burst transmission (Burst Type) of the task, an access restriction (Lock) to a specific resource during the task, etc.

The encoding information may include information on a write address channel as well as other bus channels such as a write data channel, a read address channel, a write response channel, and a read data channel, and information indicating a region and a size of an allocated bit. In addition, the encoding information may include an indicator code indicating an operable bus channel of one or more bus channels of the partner chiplet.

A second table 720 illustrated in FIG. 7 represents an example of the decoding information. Like the encoding information, the decoding information may be a mapping table including, as labels, a transaction transmission direction (Direction), a name (Name) of data mapped to a payload of a die-to-die interface flit, bit regions (MSB, LSB) of mapped data and bit size (Size), and may include information on one or more bus channels of a partner chiplet, and information indicating a region and a size of a bit allocated to each channel. In addition, the decoding information may include an indicator code indicating an operable bus channel of one or more bus channels of the partner chiplet.

Although FIG. 7 illustrates a table as an example of the encoding information and the decoding information, aspects are not limited thereto, and any format that can represent the association of each component of the encoding information and/or the decoding information may be used. In addition, the conversion information illustrated in FIG. 7 is merely an example, and the information may be partially omitted or added according to the type of bus protocol used by the chiplet. In addition, the encoding information and the decoding information of FIG. 7 may include the same information as a protocol between the transaction of the partner chiplet and the payload of the flit.

FIG. 8 is a diagram provided to explain conversion information 800 associated with a uni-directional protocol. If the bus protocol of the partner chiplet is a uni-directional protocol, the conversion information may include only the encoding information for transmitting the protocol to the partner chiplet. In this case, like the encoding and decoding information of FIG. 7, the conversion information may be a mapping table including, as labels, a transaction transmission direction (Direction), a name (Name) of data mapped to the payload of a die-to-die interface flit, bit regions (MSB, LSB) of mapped data, and bit size (Size), but the transmission direction of the transaction may be one-way rather than two-way.

If the protocol of the partner chiplet is AXI-S, which is a uni-directional protocol, data mapped to the payload of the interface flit may include information on actually transmitted data (TDATA), data validity (TSTRB, TKEEP), terminal indication (TLAST) of a data frame, identifier (TID), destination (TDEST) of a data stream, user-defined signal (TUSER), and function (TWAKEUP) to wake up other components in a specific situation. In addition, the conversion information may include an indicator code indicating an operable bus channel of one or more bus channels of the partner chiplet.

The conversion information illustrated in FIG. 8 is merely an example, and the information may be partially omitted or added according to the type of bus protocol used by the chiplet.

FIG. 9 is a diagram 900 provided to explain the indicator code. The indicator code may be a code indicating an operable bus channel of one or more bus channels of the partner chiplet. The indicator code may be mapped to the top of the payload of the die-to-die interface flit. For example, if "5b1_0000" is mapped to a portion of the payload to which the indicator code is mapped, it may mean that all bus channels WA, WD, RA, WR, and RD of the partner chiplet are not operable. On the other hand, if "5b1_1111" is mapped to a portion of the payload to which the indicator code is mapped, it may mean that all bus channels WA, WD, RA, WR, and RD of the partner chiplet are operable.

The code illustrated in FIG. 9 is an example, and aspects are not limited thereto and the form of the code may vary. Likewise, the name of the bus channel shown in FIG. 9 is also an example, and aspects are not limited thereto and may vary according to the type of bus protocol used by the partner chiplet.

Figure 10:
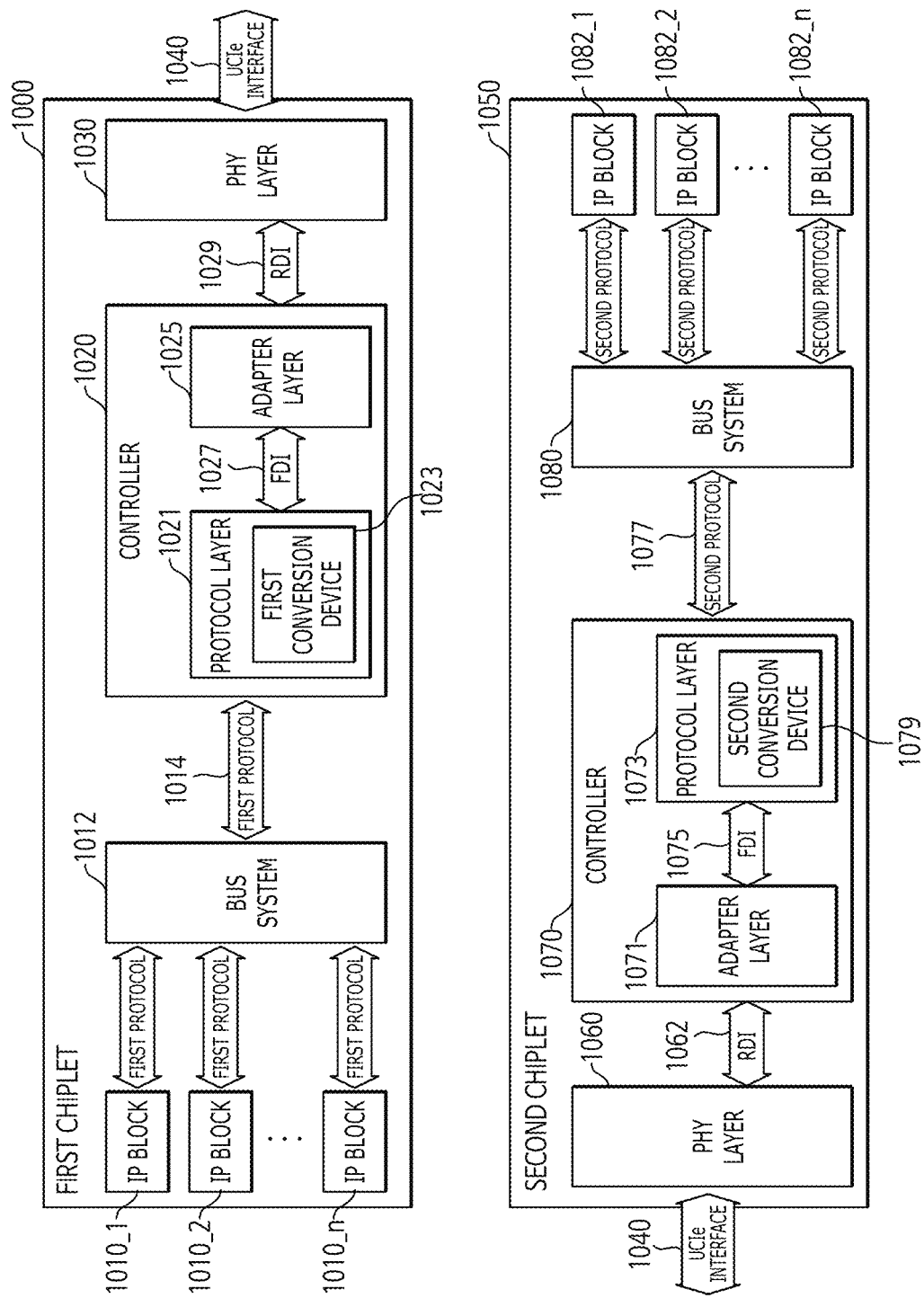
FIG. 10 is a diagram provided to explain another method for performing communication between chiplets.

FIG. 10 is a diagram provided to explain another method for performing communication between chiplets. In FIG. 10, a first chiplet 1000 and a second chiplet 1050 may be chiplets in the same chiplet system. In the following description, a description for a configuration that is the same as or similar to the configuration already described above in FIG. 1 may be omitted.

The first chiplet 1000 may use a first protocol type as a bus protocol, and the second chiplet 1050 may use a second protocol type as a bus protocol. In this case, the first protocol type and the second protocol type may be different from each other, or may be the same protocol with different detailed parameters (e.g., AxSIZE, AxLen, number of user-defined bits, etc.). For example, the first protocol type may be AXI3, and the second protocol type may be AXI4. As another example, the first protocol type may be AXI4 with 40 user-defined bits, and the second protocol type may be AXI4 with 20 user-defined bits.

A plurality of IP blocks 1010_1 to 1010_n and a controller 1020 of the first chiplet 1000 may transmit and receive data to and from each other through a bus system 1012. For example, a protocol layer 1021 of the controller 1020 may receive a first protocol type transaction 1014 from the plurality of IP blocks 1010_1 to 1010_n of the first chiplet through the bus system 1012, and a first conversion device 1023 may encode the received transaction to generate a payload of a die-to-die interface flit. As another example, the protocol layer 1021 of the controller 1020 may transmit the first protocol type transaction 1014 decoded by the first conversion device 1023 to the plurality of IP blocks 1010_1 to 1010_n through the bus system 1012. In this case, the die-to-die interface flit may be a UCIe flit.

The protocol layer 1021 and an adapter layer 1025 may transmit and receive data to and from each other through a flit-aware die-to-die interface (FDI) 1027. The FDI 1027 may refer to an interface that recognizes and manages data in units of flits when transmitting the data. For example, the protocol layer 1021 may transmit the payload of the die-to-die interface flit generated by the first conversion device 1023 to the adapter layer 1025 through the FDI 1027. As another example, the protocol layer 1021 may receive the payload of the die-to-die interface flit from the adapter layer 1025 through the FDI 1027.

The controller 1020 and a PHY layer 1030 may transmit and receive data to and from each other through a raw die-to-die interface (RDI) 1029. The RDI 1029 may refer to an interface that directly transmits data without complex data processing or processing for the simplification of data transmission and minimized latency. For example, the adapter layer 1025 of the controller 1020 may generate a header and a trailer of a die-to-die interface flit, combine the same with a payload to generate a die-to-die interface flit, and transmit the die-to-die interface flit to the PHY layer 1030 through the RDI 1029. As another example, the PHY layer 1030 may transmit a die-to-die interface flit received from the second chiplet 1050 to the adapter layer 1025 through the RDI 1029.

The first chiplet 1000 and the second chiplet 1050 may transmit and receive data to and from each other through a UCIe interface 1040. For example, the first chiplet 1000 and the second chiplet 1050 may transmit and receive die-to-die interface flits to and from each other through the UCIe interface 1040.

Like the first chiplet 1000, a PHY layer 1060 and a controller 1070 of the second chiplet 1050 may transmit and receive data to and from each other through a RDI 1062. For example, the adapter layer 1071 of the controller 1070 may generate a header and a trailer of a die-to-die interface flit, combine the same with a payload to generate a die-to-die interface flit, and transmit the generated die-to-die interface flit to the PHY layer 1060 through the RDI 1062. As another example, the PHY layer 1060 may transmit the die-to-die interface flit received from the first chiplet 1000 to the adapter layer 1071 through the RDI 1062.

The protocol layer 1021 and the adapter layer 1025 may transmit and receive data to and from each other through the FDI 1027. For example, the protocol layer 1073 may transmit the payload of the die-to-die interface flit generated by the second conversion device 1079 to the adapter layer 1071 through the FDI 1075. As another example, the protocol layer 1073 may receive the payload of the die-to-die interface flit from the adapter layer 1025 through the FDI 1075.

The first conversion device 1023 and the second conversion device 1079 may encode and decode data by referring to the same conversion information. For example, the first conversion device 1023 may encode a first protocol type transaction based on the conversion information to generate a payload of a die-to-die interface flit. The second conversion device 1079 may decode the payload of the die-to-die interface flit transmitted from the first chiplet based on the same conversion information to generate a second protocol type transaction 1077. As another example, the second conversion device 1079 may encode the second protocol type transaction based on the conversion information to generate a payload of a die-to-die interface flit. The first conversion device 1023 may decode the payload of the die-to-die interface flit transmitted from the second chiplet based on the same conversion information to generate the first protocol type transaction 1014. To this end, the first chiplet 1000 and the second chiplet 1050 may exchange the conversion information during an initialization process. Details of an example of the conversion information will be described below with reference to FIG. 11. The controller 1070 and a plurality of IP blocks 1082_1 to 1082_n of the second chiplet 1050 may transmit and receive the second protocol type transaction 1077 to and from each other through a bus system 1080.

The first conversion device 1023 and the second conversion device 1079 in FIG. 10 illustrate the functional elements for performing encoding and decoding, and are not limited to any specific implementation method. For example, the first conversion device 1023 and the second conversion device 1079 may be hardware devices including a converter that performs encoding and decoding and a register that stores encoding information and decoding information. As another example, the first conversion device 1023 and the second conversion device 1079 may be software that performs encoding and decoding.

As discussed in the above configuration, a chiplet system may be configured to encode and decode data based on the same conversion information, thereby enabling communication between chiplets adopting different protocols. Accordingly, interoperability can be improved compared to a chiplet system that is capable of converting only a predetermined number of protocols. In addition, each configuration of the chiplet can be designed independently regardless of the configuration of the partner chiplet in the chiplet system.

FIG. 11 is a diagram provided to explain conversion information 1100. As illustrated in FIG. 11, the conversion information 1100 may be a mapping table including information on a payload header and payload data.

The information on the header of the payload may include information on a packet ID, a payload type, and a payload size. For example, the information on the header of the payload may include a position in the payload and size of the bit to which the packet ID is to be mapped, a position and size of the bit to which the write address code is to be mapped, and a position and size of the bit to which the payload is to be mapped. In addition, the information on the header of the payload may include a payload type code. For example, the information on the header of the payload may include, as the payload type code, a write address code, a write data code, a write response code, a read address code, and a read data code.

The information on payload data may include information on a specific payload type data. For example, the information on payload data may include information on a position and size of a bit to which the write address data is to be mapped.

The first chiplet and the second chiplet included in the chiplet system may exchange conversion information in the initialization step, and determine a conversion rule based on the same conversion information. For example, in generating a payload of a die-to-die interface flit from a first protocol type transaction, the first conversion device of the first chiplet that has exchanged the conversion information 1100 illustrated in FIG. 11 may encode the data in the order of packet ID, write address code, payload size, and payload data for write address data. In addition, the second conversion device of the second chiplet that has exchanged the same conversion information may recognize that, in the upper bits of the payload of the die-to-die interface flit received from the first chiplet, the write address data is mapped in the order of packet ID, write address code, payload size, and payload data, and decode the same to generate a second protocol type transaction.

FIG. 11 illustrates one example of the conversion information 1100, but aspects are not limited thereto, and some information may be omitted or added, or other types of information may be included. In addition, the form of the conversion information 1100 is not limited to the mapping table information, and may have various other forms.

Figure 12:
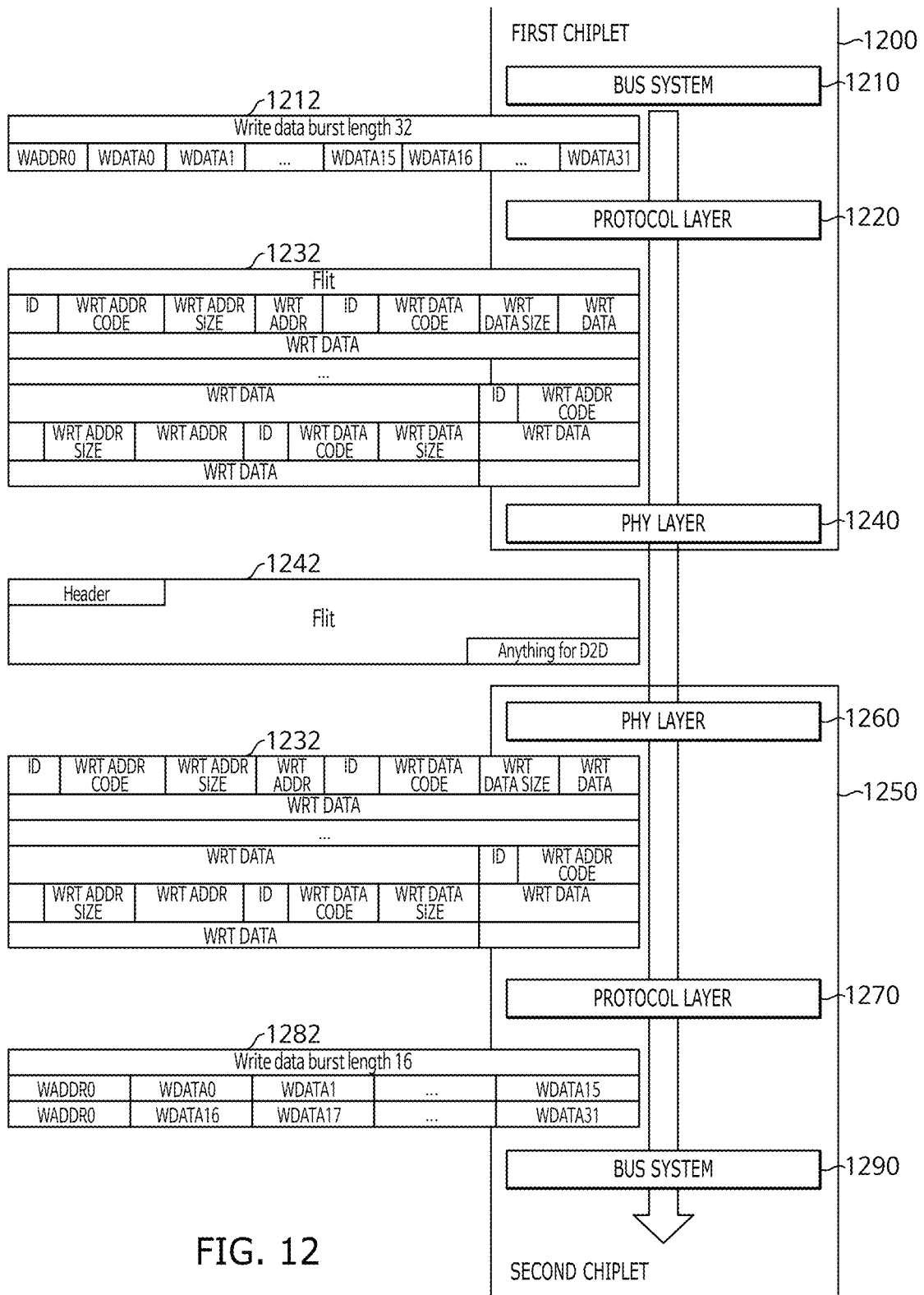
FIG. 12 is a diagram provided to explain another method for transmitting the first protocol type transaction of the first chiplet to the second chiplet.

FIG. 12 is a diagram provided to explain another method for transmitting a first protocol type transaction 1212 of a first chiplet 1200 to a second chiplet 1250. In FIG. 12, for example, the first protocol type transaction of the first chiplet may be an AXI4 transaction having a burst length of 32, which is a length of data block transmitted at a time when the task is performed. In addition, the second protocol type transaction of the second chiplet may be an AXI3 transaction having a burst length of 16, which is a length of data block transmitted at a time when the task is performed.

The first chiplet 1200 may exchange the conversion information (e.g., packet ID, payload type code, payload size, etc.) with the second chiplet 1250 in the initialization process, before transmitting the transaction 1212 to the second chiplet 1250.

The transaction 1212 may be transmitted to a protocol layer 1220 of the first chiplet through a bus system 1210 of the first chiplet 1200. The protocol layer 1220 may include an encoder as a conversion device. The protocol layer 1220 may generate a payload 1232 of a die-to-die interface flit. For example, the protocol layer 1220 may map the information included in the transaction 1212 in the order of ID, Write Address Code, Write Address Size, and Write Address Data according to the conversion information to generate the payload 1232.

The payload 1232 may be transmitted to the adapter layer (not illustrated) of the first chiplet 1200, and the adapter layer may combine a header and/or control bit (e.g., a trailer, etc.) required for a die-to-die connection with the payload 1232 to generate a flit 1242 and transmit the flit to a PHY layer 1240 of the first chiplet 1200. The PHY layer 1240 of the first chiplet 1200 may transmit the flit 1242 to a PHY layer 1260 of the second chiplet 1250.

The PHY layer 1260 of the second chiplet 1250 may transmit the received flit 1242 to an adapter layer (not illustrated) of the second chiplet 1250. The adapter layer of the second chiplet 1250 may extract the payload 1232 from the flit 1242, and transmit the extracted payload to a protocol layer 1270 of the second chiplet 1250.

The protocol layer 1270 of the second chiplet 1250 may generate an AXI3 transaction 1282 based on the conversion information provided in the initialization process. The protocol layer of the second chiplet 1250 may include a decoder. For example, the protocol layer 1270 may generate the AXI3 transaction 1282 decoded according to AXI3, that is, the protocol of the second chiplet 1250, based on the same conversion information. The transaction 1282 generated in this way may be transmitted to the IP block (not illustrated) of the second chiplet through a bus system 1290 of the second chiplet.

In FIG. 12, it is described that the protocol layer 1220 of the first chiplet 1200 includes the encoder as a conversion device, and that the protocol layer 1270 of the second chiplet 1250 includes the decoder as a conversion device, but aspects are not limited thereto. That is, the protocol layer 1220 of the first chiplet 1200 may include a decoder as the conversion device, and the protocol layer 1270 of a second chiplet 1200 may include an encoder as the conversion device. In this case, the method of data transmission from the first chiplet 1200 to the second chiplet 1250 described in FIG. 12 may be applied in the same or similar manner to the method of data transmission from the second chiplet 1250 to the first chiplet 1200.

Figure 13:
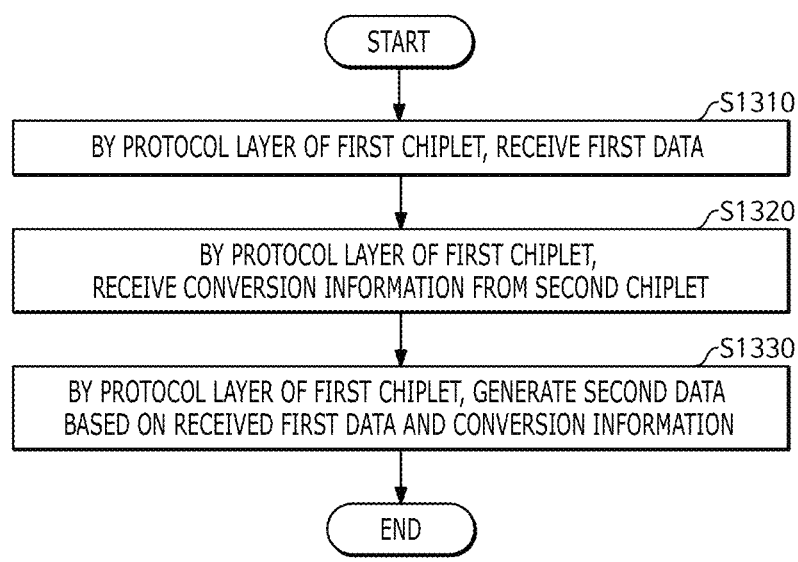
FIG. 13 is a flowchart provided to explain a method for communicating between chiplets in a chiplet system.

FIG. 13 is a flowchart provided to explain a method 1300 for communicating between chiplets in a chiplet system. The chiplet system may include a first chiplet and a second chiplet, in which the first chiplet may include a controller including a protocol layer. The method 1300 may be initiated by the protocol layer of the first chiplet by receiving first data, at S1310. By the protocol layer of the first chiplet, the conversion information may be received from the second chiplet, at S1320. By the protocol layer of the first chiplet, the conversion information may be received from the second chiplet, at S1330.

The first chiplet may further include a bus system, and the protocol layer of the first chiplet may receive the first data through the bus system. In addition, the first data may include a first protocol type transaction associated with the first chiplet, and the conversion information may be encoding information associated with the second protocol. In addition, the second protocol may be associated with the second chiplet, and the second data may include the payload of the first die-to-die interface flit associated with the second protocol.

The protocol layer may include a processor and a submemory, in which the processor may determine an encoding rule based on the encoding information associated with the second protocol and encode a first protocol type transaction according to the determined encoding rule to generate a payload of the first die-to-die interface flit, and the first protocol type transaction may be stored in the sub-memory.

The first chiplet may further include an adapter layer, and the adapter layer may generate a header of the first die-to-die interface flit associated with the second protocol, and combine the header and the payload to generate the first die-to-die interface flit.

If the second protocol associated with the second chiplet is a uni-directional protocol from the first chiplet to the second chiplet, the conversion information may include only the conversion information from the first chiplet to the second chiplet.

The first chiplet may further include an adapter layer, and the adapter layer may receive the first data. In addition, the first data may include the payload of the second die-to-die interface flit associated with the second protocol, and the second protocol may be associated with the second chiplet. The conversion information may include the decoding information associated with the second protocol, and the second data may include the first protocol type transaction associated with the first chiplet.

The protocol layer may include a processor, and the processor may determine a decoding rule based on the decoding information associated with the second protocol and decode the payload of the second die-to-die interface flit according to the determined decoding rule to generate a first protocol type transaction. In addition, the adapter layer may extract the payload from the second die-to-die interface flit.

The conversion information may include the encoding or decoding information associated with the second protocol, and the second protocol may be associated with the second chiplet. In addition, the encoding or decoding information associated with the second protocol may include information on one or more bus channels of the second chiplet, and information indicating the region and size of bits allocated to each of the one or more bus channels. In addition, the conversion information may further include an indicator code that indicates an operable bus channel of one or more bus channels of the second chiplet.

The flowchart and description described above are merely examples, and may be implemented differently in some examples. For example, in some examples, the order of respective operations may be changed, some of the operations may be repeatedly performed, some may be omitted, or some may be added.

Figure 14:
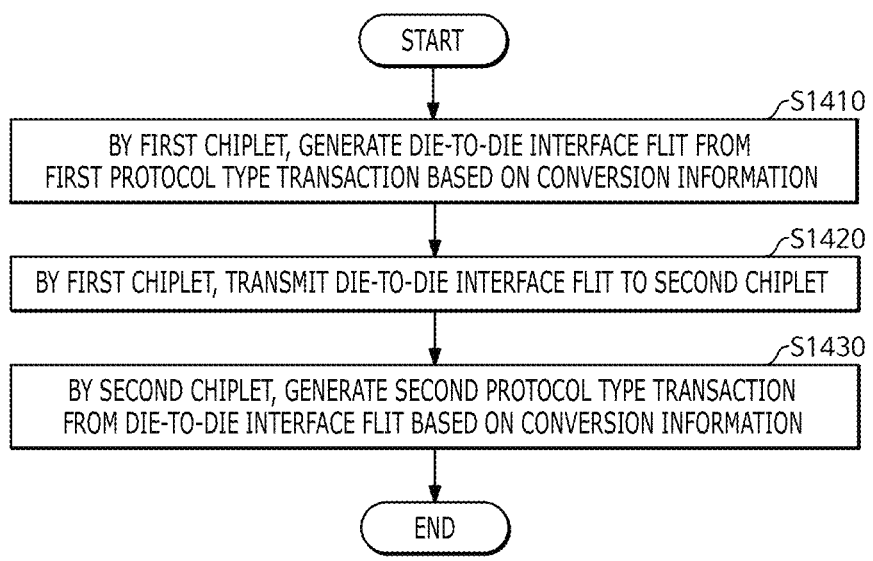
FIG. 14 is a flowchart provided to explain a method for communicating between chiplets in a chiplet system according to another aspect of the present disclosure.

FIG. 14 is a flowchart provided to explain a method 1400 for communicating between chiplets in a chiplet system according to another aspect of the present disclosure. The chiplet system may include a first chiplet and a second chiplet, and the method 1400 may be initiated by the first chiplet by generating a die-to-die interface flit from a first protocol type transaction based on the conversion information, at S1410.

The first chiplet may include a controller including a protocol layer and an adapter layer, in which the protocol layer of the first chiplet may generate a die-to-die interface flit from the first protocol type transaction based on the conversion information, and the adapter layer of the first chiplet may combine the header and the payload to generate a die-to-die interface flit.

The first chiplet may further include a PHY layer, in which the adapter layer of the first chiplet may transmit the die-to-die interface flit to the PHY layer of the first chiplet, and transmit, by the PHY layer of the first chiplet, the die-to-die interface flit to the second chiplet.

By the first chiplet, the die-to-die interface flit may be transmitted to the second chiplet, at S1420. The second chiplet may include a PHY layer, and the first chiplet may transmit the die-to-die interface flit to the PHY layer of the second chiplet.

By the second chiplet, the second protocol type transaction may be generated from die-to-die interface flit based on the conversion information, at S1430. The second chiplet may include a controller including an adapter layer and a protocol layer, in which the adapter layer of the second chiplet may extract a payload of a flit from the die-to-die interface flit, and the protocol layer of the second chiplet may generate a second protocol type transaction from the payload.

The first chiplet and the second chiplet may exchange the conversion information. In addition, the conversion information may include information on a packet ID, a payload type code, a payload type size, and a payload size. The payload type code may include a write address code, a write data code, a write response code, a read address code, and a read data code.

The first protocol may be related to the first chiplet, the second protocol may be related to the second chiplet, and the first protocol and the second protocol may be different from each other. In addition, the first and second chiplets may be designed based on the universal chiplet interconnect express (UCIe) standard, and the die-to-die interface flits may include UCIe flits.

The flowchart and description described above are merely examples, and may be implemented differently in some examples. For example, in some examples, the order of respective operations may be changed, some of the operations may be repeatedly performed, some may be omitted, or some may be added.

Figure 15:
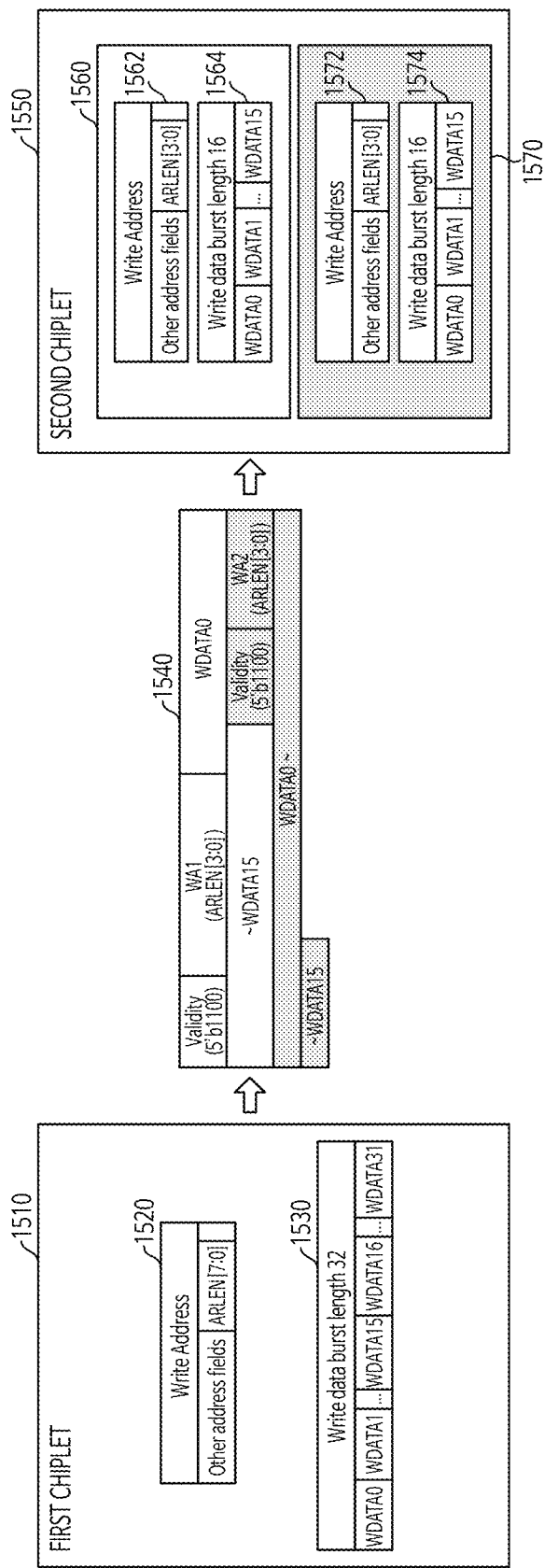
FIG. 15 is a diagram provided to explain a method for transmitting the first protocol type transaction of the first chiplet to the second chiplet according to another aspect of the present disclosure.

FIG. 15 is a diagram provided to explain a method for transmitting a first protocol type transaction of a first chiplet 1510 to a second chiplet 1550, according to another aspect of the present disclosure. The first chiplet 1510 may utilize the first protocol type transaction, and in this case, the first protocol type may be AXI4. In addition, the second chiplet 1550 may utilize the second protocol type transaction, and in this case, the second protocol type may be AXI3. The first protocol type transaction may include a write address 1520 and write data 1530 having a burst length of 32, which is a length of data block transmitted at a time when the task is performed.

The first chiplet 1510 may convert the first protocol type transaction into a die-to-die interface flit and transmit the converted transaction to the second chiplet 1550. In this case, the first chiplet 1510 may modify the first protocol type transaction based on the encoding information (not illustrated) received from the second chiplet 1550, and generate a payload 1540 of the die-to-die interface flit. The encoding information received from the second chiplet refers to information encoded in the first chiplet, and may include information used for decoding in the second chiplet, For example, the second protocol AXI3 of the second chiplet 1550 should have a write address of ARLEN [3:0] and a write data length of 16, which may be different from those supported by the first protocol AXI4 of the first chiplet 1510. To address the issue mentioned above, when generating the transaction into the payload 1540, the first chiplet 1510 may divide the transaction into two and generate the payload 1540. In this case, the payload 1540 may include a portion corresponding to a first transaction including a 4-bit first write address WA1 and first write data having a length of 16, and a portion corresponding to a second transaction including a 4-bit second write address WA2 and second write data having a length of 16.

The second chiplet 1550 may generate a second protocol type transaction from the payload 1540. The process of generating the second protocol type transaction using the payload 1540 in the second chiplet 1550 may be referred to as a decoding process in the second chiplet 1550. The payload 1540 includes data for two separate transactions, and the second chiplet 1550 may generate a plurality of second protocol type transactions 1560 and 1570. For example, a first second protocol type transaction 1560 may include a first write address 1562 and first write data having a length of 16. Likewise, a second protocol type transaction 1570 may include a second write address 1572 and second write data 1574 having a length of 16.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, computer, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or marking data storage devices, etc. The commands may be executable by one or more processors, and may cause the processor(s) to perform certain aspects of the functions described in the present disclosure.

If implemented in software, the techniques described above may be stored on a computer-readable medium as one or more instructions or codes, or may be sent via a computer-readable medium. The computer-readable media include both the computer storage media and the communication media including any medium that facilitates the transmission of a computer program from one place to another. The storage media may also be any available media that may be accessible to a computer. By way of non-limiting example, such a computer-readable medium may include RAM, ROM, EEPROM, CD-ROM or other optical disk storage, magnetic disk storage or other magnetic storage devices, or any other media that can be used to transmit or store desired program code in the form of commands or data structures and can be accessible to a computer. In addition, any connection is properly referred to as a computer-readable medium.

For example, if the software is sent from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be connected to the processor such that the processor may read or write information from or to the storage medium. Alternatively, the storage medium may be integrated into the processor. The processor and the storage medium may be present in the ASIC. The ASIC may exist in the user terminal. Alternatively, the processor and storage medium may exist as separate components in the user terminal.

Although the examples described above have been described as utilizing aspects of the currently disclosed subject matter in one or more standalone computer systems, aspects are not limited thereto, and may be implemented in conjunction with any computing environment, such as a network or distributed computing environment. Furthermore, the aspects of the subject matter in the present disclosure may be implemented in multiple processing chips or apparatus, and storage may be similarly influenced across a plurality of apparatus. Such apparatus may include PCs, network servers, and portable apparatus.

Although the present disclosure has been described in connection with some aspects herein, various modifications and changes can be made without departing from the scope of the present disclosure, which can be understood by those skilled in the art to which the present disclosure pertains. Additionally, such modifications and changes should be considered to fall within the scope of the claims appended hereto.

What is claimed is:

1. A method for communicating between chiplets in a chiplet system, wherein the chiplet system includes a first chiplet and a second chiplet, the method comprising:
   by the first chiplet, generating a die-to-die interface flit from a first protocol type transaction based on conversion information;
   by the first chiplet, transmitting the die-to-die interface flit to the second chiplet; and
   by the second chiplet, generating a second protocol type transaction from the die-to-die interface flit based on the conversion information,
   wherein the conversion information includes information on a packet ID, a payload type code, a payload type size, and a payload size.

2. The method according to claim 1, wherein
   the first chiplet includes a controller including a protocol layer and an adapter layer, and
   the generating by the first chiplet the die-to-die interface flit from the first protocol type transaction based on the conversion information includes:
   by the protocol layer of the first chiplet, generating a payload of the die-to-die interface flit from the first protocol type transaction based on the conversion information;
   by the adapter layer of the first chiplet, generating a header of the die-to-die interface flit; and
   by the adapter layer of the first chiplet, generating the die-to-die interface flit by combining the header and the payload.

3. The method according to claim 1, wherein
   the first chiplet further includes a physical (PHY) layer, and
   the transmitting by the first chiplet the die-to-die interface flit to the second chiplet includes:
   by the adapter layer of the first chiplet, transmitting the die-to-die interface flit to the PHY layer of the first chiplet; and
   by the PHY layer of the first chiplet, transmitting the die-to-die interface flit to the second chiplet.

4. The method according to claim 1, before generating the die-to-die interface flit, further comprising, by the first chiplet and the second chiplet, exchanging the conversion information.

5. The method according to claim 1, wherein the payload type code includes a write address code, a write data code, a write response code, a read address code, and a read data code.

6. The method according to claim 1, wherein
   the second chiplet includes a PHY layer, and
   the transmitting by the first chiplet the die-to-die interface flit to the second chiplet includes, by the first chiplet, transmitting the die-to-die interface flit to the PHY layer of the second chiplet.

7. The method according to claim 1, wherein
   the second chiplet includes a controller including an adapter layer and a protocol layer, and
   the generating by the second chiplet the second protocol type transaction from the die-to-die interface flit based on the conversion information includes:
   by the adapter layer of the second chiplet, extracting a payload of the die-to-die interface flit from the flit; and
   by the protocol layer of the second chiplet, generating the second protocol type transaction from the payload.

8. The method according to claim 1, wherein
   the first protocol relates to the first chiplet,
   the second protocol relates to the second chiplet, and
   the first protocol and the second protocol are different from each other.

9. The method according to claim 1, wherein
   the first chiplet and the second chiplet are designed based on universal chiplet interconnect express (UCIe) standard, and
   the die-to-die interface flit includes a UCIe flit.

10. A chiplet system, wherein
    the chiplet system includes a first chiplet and a second chiplet,
    the first chiplet is configured to generate a die-to-die interface flit from a first protocol type transaction based on conversion information, and transmit the die-to-die interface flit to the second chiplet, and
    the second chiplet is configured to generate a second protocol type transaction from the die-to-die interface flit based on the conversion information,
    wherein the conversion information includes information on a packet ID, a payload type code, a payload type size, and a payload size.

11. The chiplet system according to claim 10, wherein
    the first chiplet includes a controller including a protocol layer and an adapter layer, and
    the generating the die-to-die interface flit from the first protocol type transaction based on the conversion information includes:
    by the protocol layer of the first chiplet, generating a payload of the die-to-die interface flit from the first protocol type transaction based on the conversion information;
    by the adapter layer of the first chiplet, generating a header of the die-to-die interface flit; and
    by the adapter layer of the first chiplet, generating the die-to-die interface flit by combining the header and the payload.

12. The chiplet system according to claim 10, wherein
    the first chiplet further includes a PHY layer, and
    the transmitting the die-to-die interface flit to the second chiplet includes:
    by the adapter layer of the first chiplet, transmitting the die-to-die interface flit to the PHY layer of the first chiplet; and
    by the PHY layer of the first chiplet, transmitting the die-to-die interface flit to the second chiplet.

13. The chiplet system according to claim 10, wherein, before generating the die-to-die interface flit, the first chiplet and the second chiplet exchange the conversion information.

14. The chiplet system according to claim 10, wherein the payload type code includes a write address code, a write data code, a write response code, a read address code, and a read data code.

15. The chiplet system according to claim 10, wherein
the second chiplet includes a PHY layer, and
the transmitting the die-to-die interface flit to the second chiplet includes transmitting the die-to-die interface flit to the PHY layer of the second chiplet.

16. The chiplet system according to claim 10, wherein
the second chiplet includes a controller including an adapter layer and a protocol layer, and
the generating the second protocol type transaction from the die-to-die interface flit based on the conversion information includes:
by the adapter layer of the second chiplet, extracting a payload of the die-to-die interface flit from the flit; and
by the protocol layer of the second chiplet, generating a second protocol type transaction from the payload.

17. The chiplet system according to claim 10, wherein
the first protocol relates to the first chiplet,
the second protocol relates to the second chiplet, and
the first protocol and the second protocol are different from each other.

18. The chiplet system according to claim 10, wherein
the first chiplet and the second chiplet are designed based on the universal chiplet interconnect express (UCIe) standard, and
the die-to-die interface flit includes a UCIe flit.

* * * * *